US009020119B2

(12) United States Patent
Colbert

(10) Patent No.: US 9,020,119 B2
(45) Date of Patent: Apr. 28, 2015

(54) MODERATION CONTROL METHOD FOR PARTICIPANTS IN A HETEROGENEOUS CONFERENCE CALL

(75) Inventor: Michael Scott Colbert, DeBary, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/285,442

(22) Filed: Oct. 31, 2011

(65) Prior Publication Data
US 2013/0108034 A1 May 2, 2013

(51) Int. Cl.
| H04M 3/42 | (2006.01) |
| H04M 11/00 | (2006.01) |
| H04M 1/00 | (2006.01) |
| H04L 12/16 | (2006.01) |
| H04Q 11/00 | (2006.01) |
| H04M 3/56 | (2006.01) |

(52) U.S. Cl.
CPC .............. H04M 3/566 (2013.01); *H04M 3/564* (2013.01)
USPC .................... 379/202.01; 379/93.21; 379/158; 370/260; 455/416

(58) Field of Classification Search
CPC ......... H04M 3/42; H04M 3/56; H04M 3/564; H04M 3/565; H04M 3/566; H04M 3/567; H04M 3/568; H04M 3/42221; H04N 7/146; H04N 7/15; H04L 12/18
USPC ................ 379/90.01, 93.01, 93.21, 157, 158, 379/201.01, 202.01, 207.01; 370/259, 260, 370/261, 262; 455/414.1, 416
See application file for complete search history.

(56) References Cited

U.S. PATENT DOCUMENTS

| 4,544,804 A | 10/1985 | Herr et al. |
| 5,212,726 A | 5/1993 | Dayner et al. |
| 5,373,549 A * | 12/1994 | Bales et al. ................. 379/93.21 |
| 5,859,979 A | 1/1999 | Tung et al. |

(Continued)

FOREIGN PATENT DOCUMENTS

| EP | 1895776 | 3/2008 |
| WO | 97/32256 | 9/1997 |
| WO | 02/087204 | 10/2002 |
| WO | WO 2007/101143 | 9/2007 |
| WO | 2010/111867 | 10/2010 |

OTHER PUBLICATIONS

Extended European Search Report, dated Apr. 10, 2012, for European Patent Application No. 11187286.7.

(Continued)

*Primary Examiner* — Khai N Nguyen
(74) *Attorney, Agent, or Firm* — Finnegan, Henderson, Farabow, Garrett & Dunner, LLP

(57) ABSTRACT

Presented are systems and methods for providing moderator control in a heterogeneous conference including acquiring a merge control to merge a first conference with a second conference to create a single heterogeneous conference, wherein the first conference and the second conference utilize different types of conference hosting systems. The system sends the merge control to a server, wherein the server is configured to establish conference connections with the first conference and the second conference. The system then merges the first conference with the second conference to create the heterogeneous conference and determines a moderator for the heterogeneous conference. The system automatically transfers one or more moderator controls to the moderator of the heterogeneous conference.

31 Claims, 10 Drawing Sheets

(56) References Cited

U.S. PATENT DOCUMENTS

| | | | |
|---|---|---|---|
| 5,973,724 | A | 10/1999 | Riddle |
| 6,275,575 | B1* | 8/2001 | Wu .................. 379/202.01 |
| 7,161,926 | B2 | 1/2007 | Elson et al. |
| 7,242,755 | B2 | 7/2007 | Cope et al. |
| 7,353,251 | B1 | 4/2008 | Balakrishnan |
| 7,697,490 | B2 | 4/2010 | Dssouli et al. |
| 7,822,186 | B1 | 10/2010 | Boni |
| 7,849,138 | B2 | 12/2010 | Gu et al. |
| 7,865,180 | B2 | 1/2011 | Davis et al. |
| 7,933,621 | B1 | 4/2011 | Vu et al. |
| 8,611,877 | B2 | 12/2013 | Buzdugan |
| 2002/0110092 | A1 | 8/2002 | Kluck et al. |
| 2003/0144004 | A1 | 7/2003 | Canova et al. |
| 2003/0223562 | A1 | 12/2003 | Cui et al. |
| 2004/0010549 | A1 | 1/2004 | Matus et al. |
| 2004/0047461 | A1* | 3/2004 | Weisman et al. ........ 379/202.01 |
| 2005/0063313 | A1 | 3/2005 | Nanavati et al. |
| 2005/0278424 | A1 | 12/2005 | White |
| 2006/0270447 | A1 | 11/2006 | Everson et al. |
| 2007/0002779 | A1 | 1/2007 | Lee et al. |
| 2007/0086365 | A1 | 4/2007 | Chen et al. |
| 2007/0091169 | A1 | 4/2007 | Zhang et al. |
| 2007/0177529 | A1* | 8/2007 | Provino et al. ................ 370/260 |
| 2007/0264989 | A1 | 11/2007 | Palakkal et al. |
| 2007/0285503 | A1* | 12/2007 | Asthana et al. ............ 348/14.08 |
| 2008/0239995 | A1 | 10/2008 | Lee et al. |
| 2009/0086951 | A1 | 4/2009 | Geppert et al. |
| 2009/0089683 | A1 | 4/2009 | Thapa |
| 2010/0007713 | A1 | 1/2010 | Yamamoto |
| 2010/0220635 | A1 | 9/2010 | Gisby et al. |
| 2011/0305332 | A1* | 12/2011 | Geppert et al. .......... 379/202.01 |
| 2012/0128322 | A1 | 5/2012 | Shaffer et al. |
| 2012/0163577 | A1* | 6/2012 | Buford et al. ............ 379/202.01 |
| 2012/0278735 | A1 | 11/2012 | Singh |
| 2013/0108033 | A1 | 5/2013 | Buzdugan |

OTHER PUBLICATIONS

Extended European Search Report, dated Jul. 5, 2012, for European Patent Application No. 12169073.9.

Communication pursuant to Article 94(3) EPC, in corresponding European Patent Application 11187286.7, mailed Jun. 14, 2013 (6 pages).

Communication pursuant to Article 94(3) EPC, in corresponding European Patent Application 12169073.9, mailed Jun. 14, 2013 (6 pages).

Floor control mechanism for Web Real-Time Communication (WebRTC) based conferences, Aug. 2012 (13 pages).

Office Action mailed by the Canadian Patent Office in Canadian Patent Application No. 2,793,374. Mailed May 26, 2014. 3 pgs.

Notice of Allowance issued in Canadian Application No. 2,793,432 on May 30, 2014; 1 page.

Office Action issued in Canadian Application No. 2,793,522 on May 27, 2014; 2 pages.

Extended European Search Report issued in European Application No. 11187303.0 on Mar. 22, 2012.

Office Action issued in European Application No. 11187303.0 on Jun. 24, 2013, 6 pages.

Invitation Pursuant to Article 94(3) and Rule 71(1) EPC issued in European Application No. 11187303.0 on Aug. 14, 2013.

Communication under Rule 71(3) EPC issued in European Application No. 11187303.0 on Dec. 20, 2013.

Extended European Search Report issued in European Application No. 11187299.0 on Apr. 4, 2012; 7 pages.

Office Action issued in U.S. Appl. No. 13/285,247 on Jan. 4, 2013; 9 pages.

Office Action issued in U.S. Appl. No. 13/285,247 on May 9, 2013; 9 pages.

Notice of Allowance issued in U.S. Appl. No. 13/285,247 on Jul. 10, 2013; 6 pages.

Office Action issued in U.S. Appl. No. 13/285,737 on Dec. 6, 2012; 13 pages.

Office Action issued in U.S. Appl. No. 13/285,737 on May 9, 2013; 8 pages.

Notice of Allowance issued in U.S. Appl. No. 13/285,737 on Aug. 21, 2013; 8 pages.

Office Action issued in U.S. Appl. No. 14/049,505 on Feb. 19, 2014; 10 pages.

Notice of Allowance issued in U.S. Appl. No. 14/049,505 on Jun. 6, 2014; 6 pages.

Notice of Allowance issued in U.S. Appl. No. 14/049,505 on Oct. 2, 2014; 6 pages.

* cited by examiner

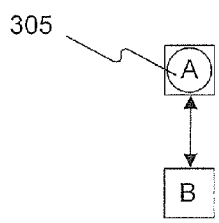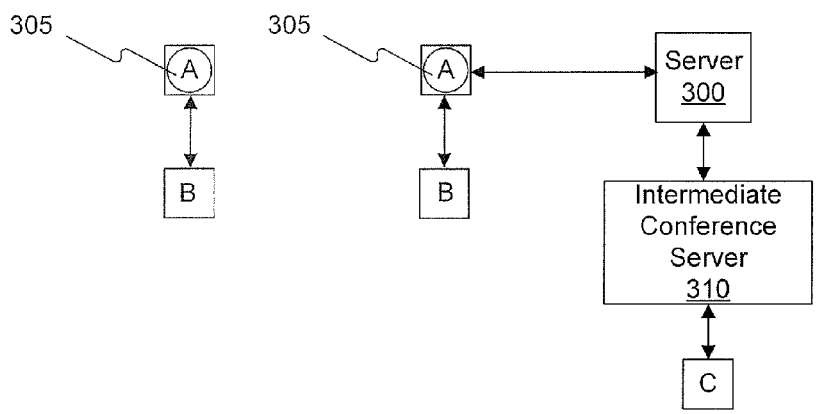
FIG. 3A  FIG. 3B
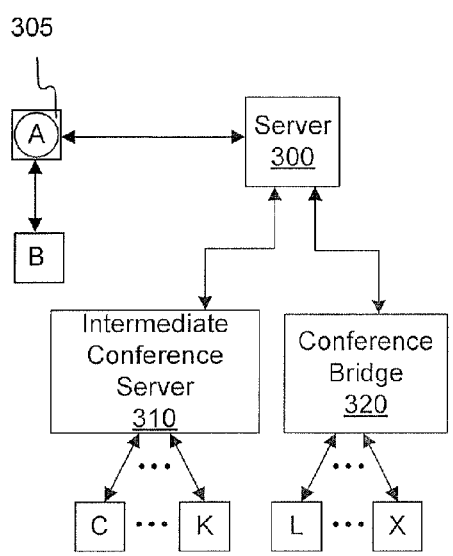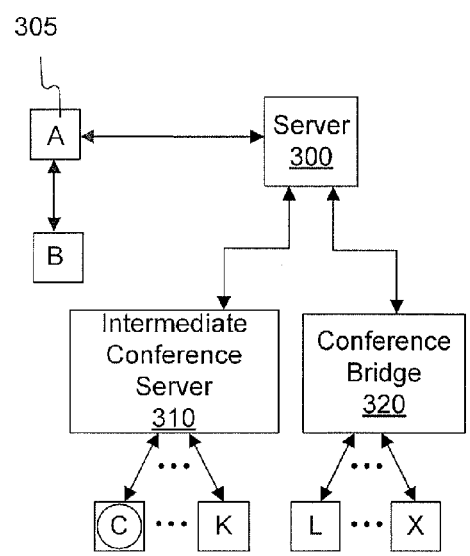
FIG. 3C  FIG. 3D

MODERATION CONTROL METHOD FOR PARTICIPANTS IN A HETEROGENEOUS CONFERENCE CALL

FIELD

Example embodiments relate to conference call systems and methods, and in particular to a method for controlling moderation when conferences are combined to form a heterogeneous conference call.

BACKGROUND

In general, there are three common conference hosting systems for executing conferencing calls: using a mobile device as the conference bridge (mobile bridge), using an intermediate conference server (for example a private branch exchange (PBX)), and using a conference bridge. The mobile bridge typically provides the fewest number of participants and number of moderator controls. The intermediate conference server generally can host larger conferences and provide an increased number of moderator controls. Additionally, the conference bridge generally can host an even larger number of participants and generally provides the moderator with the most controls.

Currently, the methods of generating conference calls are generally limited to a single conference hosting system. For example, a conference call is hosted either by only the intermediate conference server or only the conference bridge. The system independence can lead to problems of scalability when the participant level of the conference hosting system reaches its maximum limit. For example, a mobile bridge can only have a participant limit of three devices. Thus, if there are three conference call participants and if another participant will need to be added to the conference call, the conference call must be terminated. The conference call must then be implemented using a conference hosting system with additional resources, for example, the intermediate conference server or the conference bridge, thus necessitating that all of the conference call participants be reconnected into the conference using the intermediate conference server.

Additionally, moderation controls are specific to the hosting system and currently there is no method of establishing, maintaining, or transferring moderation control in heterogeneous conferences (a teleconference that includes a plurality of different conference hosting systems).

BRIEF DESCRIPTION OF THE DRAWINGS

Reference will now be made to the accompanying drawings showing example embodiments of the present application, and in which:

FIG. 3A shows an example conference call using a mobile bridge;

FIG. 3B shows an example heterogeneous conference call with a mobile bridge and an intermediate conference server;

FIG. 3C shows an example heterogeneous conference call with a mobile bridge, an intermediate conference server, and a conference server;

FIG. 3D shows the example heterogeneous conference call of FIG. 3C with a moderator coupled via the intermediate conference server;

DESCRIPTION OF EXAMPLE EMBODIMENTS

The example embodiments provided below describe a moderator control system and method where a moderator control window operating on a device (moderating device) allows a user (conference moderator) to merge a plurality of conference calls (conferences), operating using different types of conference hosting systems, into a single heterogeneous conference. A conference hosting system can be a mobile bridge, an intermediate conference server (for example a private branch exchange (PBX)), a conference bridge, or a media server. A heterogeneous conference is a conference call (audio, video, or a combination thereof) that includes a plurality of different conference hosting systems that are coupled together through a server. The moderator control system sends a merge control to the server, wherein the server is configured to establish conference connections with the conference hosting systems of the conferences being merged. The moderator control system determines the identity of the moderator of the heterogeneous conference; and automatically transfers one or more moderator controls to the moderator of the heterogeneous conference. Additionally, in some embodiments, there can be one or more sub-group moderators under the control of the moderator.

The moderator controls associated with a participant of the heterogeneous conference depend on what conference hosting system the participant is connected with. Additionally, the controls available to the moderator can vary depending on whether the conference is an audio, video, or a combination thereof. Moreover, each conference hosting system can have set formats for controls in order for the controls to be recognized by the conference hosting system. When the moderator attempts to exercise a control over a particular participant of the heterogeneous conference, the control is sent to the server that connects the different conference hosting systems. In some embodiments, the control is placed in the correct format before sending to the server. In other embodiments, the server receives the control and properly formats it before sending it to the appropriate conference hosting system.

Additionally, when adding participants to the conference, additional conference hosting systems can be added to ensure that the participant limit of the heterogeneous conference is not met. Some of the example embodiments below describe systems and methods for adding participants to a conference via additional conference hosting systems that are added as needed.

Figure 1:
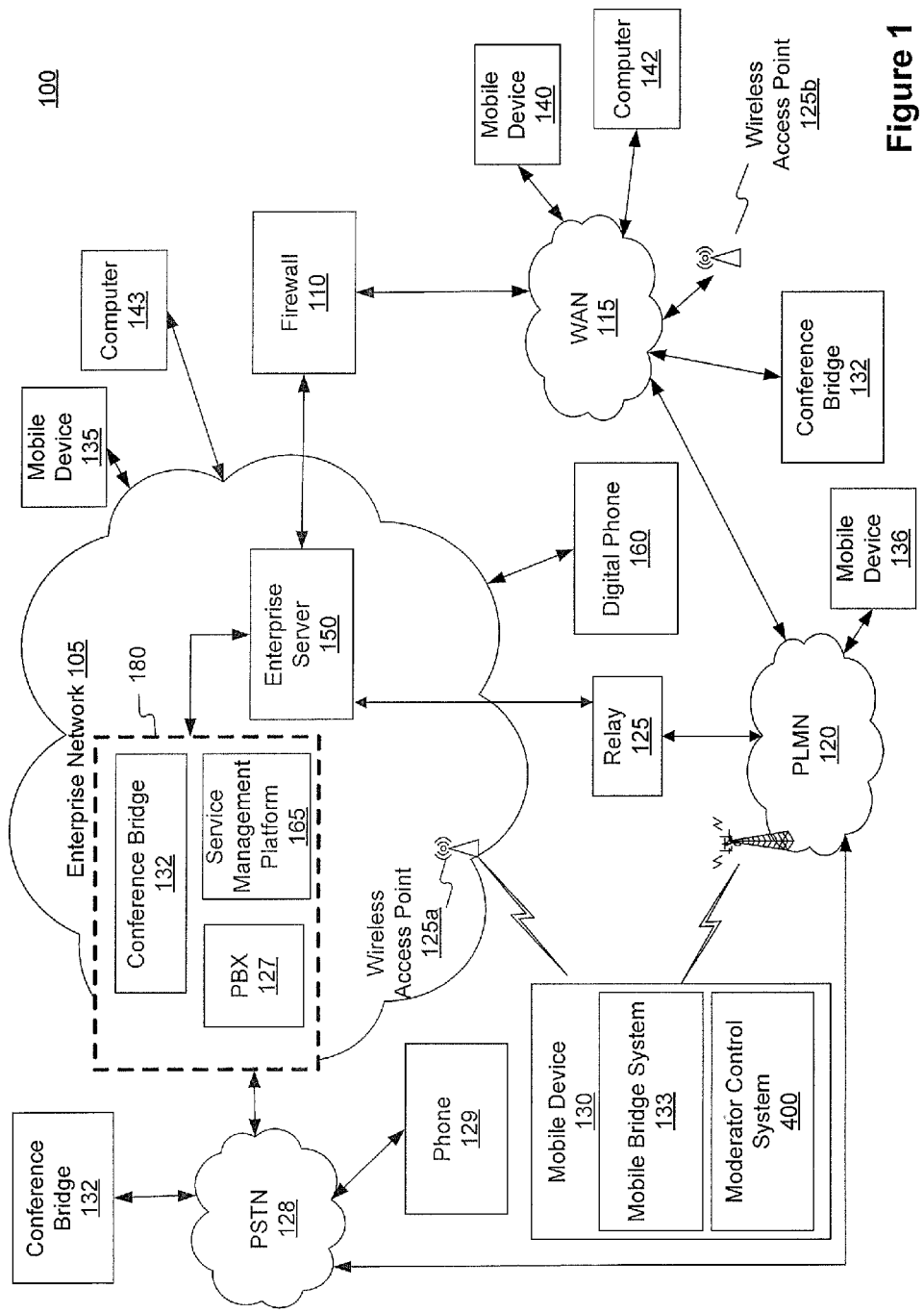
FIG. 1 shows, in block diagram form, an example system utilizing a conference call scheduling system.

Reference is now made to FIG. 1, which shows, in block diagram form, an example system utilizing a moderator control system for managing moderator control in heterogeneous conferences, generally designated 100, for the control and management of communications. System 100 includes an enterprise network 105, which in some embodiments includes a local area network (LAN). In some embodiments, enterprise network 105 can be an enterprise or business system. In some embodiments, enterprise network 105 includes more than one network and is located in multiple geographic areas.

Enterprise network 105 can be coupled often through a firewall 110, to a wide area network (WAN) 115, such as the Internet. Enterprise network 105 can also be coupled to a public switched telephone network (PSTN) 128 via direct inward dialing (DID) trunks or primary rate interface (PRI) trunks.

Enterprise network 105 can also communicate with a public land mobile network (PLMN) 120, which is also referred to as a wireless wide area network (WWAN) or, in some cases, a cellular network. The connection with PLMN 120 is via a relay 125, as known in the art.

In some embodiments, enterprise network 105 provides a wireless local area network (WLAN), not shown, featuring wireless access points, such as wireless access point 125a. In some embodiments, other WLANs can exist outside enterprise network 105. For example, a WLAN coupled to WAN 115 can be accessed via wireless access point 125b. WAN 115 is coupled to one or more mobile devices, for example mobile device 140. Additionally, WAN 115 can be coupled to one or more desktop or laptop computers 142 (one shown).

System 100 can include a number of enterprise-associated mobile devices, for example, mobile devices 130, 135, 136, and 140. Mobile devices 130, 135, 136, and 140 can include devices equipped for cellular communication through PLMN 120, mobile devices equipped for Wi-Fi communications over one of the WLANs via wireless access points 125a or 125b, or dual-mode devices capable of both cellular and WLAN communications. Wireless access points 125a or 125b can be configured to WLANs that operate in accordance with one of the IEEE 802.11 specifications.

Mobile devices 130, 135, 136, and 140 can be, for example, cellular phones, smartphones, tablets, netbooks, and a PDA (personal digital assistant) enabled for wireless communication. Moreover, mobile devices 130, 135, 136, and 140 can communicate with other components using voice communications or data communications (such as accessing content from a website). Mobile devices 130, 135, 136, and 140 include devices equipped for cellular communication through PLMN 120, devices equipped for Wi-Fi communications via wireless access points 125a or 125b, or dual-mode devices capable of both cellular and WLAN communications. Mobile devices 130, 135, 136, and 140 are described in detail below in FIG. 2.

Mobile devices 130, 135, 136, and 140 also include one or more radio transceivers and associated processing hardware and software to enable wireless communications with PLMN 120, and/or one of the WLANs via wireless access points 125a or 125b. In various embodiments, PLMN 120 and mobile devices 130, 135, 136, and 140 are configured to operate in compliance with any one or more of a number of wireless protocols, including GSM, GPRS, CDMA, EDGE, UMTS, EvDO, HSPA, 3GPP, or a variety of others. It will be appreciated that mobile devices 130, 135, 136, and 140 can roam within PLMN 120 and across PLMNs, in known manner, as their user moves. In some instances, dual-mode mobile devices 130, 135, 136, and 140 and/or enterprise network 105 are configured to facilitate roaming between PLMN 120 and a wireless access point 125a or 125b, and are thus capable of seamlessly transferring sessions (such as voice calls) from a connection with the cellular interface of dual-mode device (i.e., 130, 135, 136, and 140) to a WLAN interface of the dual-mode device, and vice versa.

Each mobile device 130, 135, 136, and 140 has the ability to act as a mobile bridge. For example, mobile device 130 includes a mobile bridge system 133 that allows mobile device 130 to act as the mobile bridge with mobile device 136. Mobile bridge system 133 can also be present in one or more of mobile devices 135, 136, and 140. Generally, a conference call hosted using a mobile bridge will have a maximum of 3 participants. Moderator controls at the mobile-bridge level include adding additional participants, muting at least one participant, un-muting at least one participant, and exiting the conference call. The particular moderator controls associated with the mobile bridge can vary depending on the type of mobile bridge used. Additionally, the controls available to the moderator can vary depending on whether the conference is an audio, video, or a combination thereof.

Enterprise network 105 typically includes a number of networked servers, computers, and other devices. For example, enterprise network 105 can connect one or more desktop or laptop computers 143 (one shown). The connection can be wired or wireless in some embodiments. Enterprise network 105 can also connect to one or more digital telephone phones 160.

Relay 125 serves to route messages received over PLMN 120 from mobile device 130 to corresponding enterprise network 105. Relay 125 also pushes messages from enterprise network 105 to mobile device 130 via PLMN 120.

Enterprise network 105 also includes an enterprise server 150. Together with relay 125, enterprise server 150 functions to redirect or relay incoming e-mail messages addressed to a user's e-mail address through enterprise network 105 to mobile device 130 and to relay incoming e-mail messages composed and sent via mobile device 130 out to the intended recipients within WAN 115 or elsewhere. Enterprise server 150 and relay 125 together facilitate a "push" e-mail service for mobile device 130, enabling the user to send and receive e-mail messages using mobile device 130 as though the user were coupled to an e-mail client within enterprise network 105 using the user's enterprise-related e-mail address, for example on computer 143.

As is typical in many enterprises, enterprise network 105 includes a Private Branch eXchange (although in various embodiments the PBX can be a standard PBX or an IP-PBX, for simplicity the description below uses the term PBX to refer to both) 127 having a connection with PSTN 128 for routing incoming and outgoing voice calls for the enterprise. PBX 127 is coupled to PSTN 128 via DID trunks or PRI trunks, for example. PBX 127 can use ISDN signaling protocols for setting up and tearing down circuit-switched connections through PSTN 128 and related signaling and communications. In some embodiments, PBX 127 can be coupled to one or more conventional analog telephones 129. PBX 127 is also coupled to enterprise network 105 and, through it, to telephone terminal devices, such as digital telephone sets 160, softphones operating on computers 143, etc. Within the enterprise, each individual can have an associated extension number, sometimes referred to as a PNP (private numbering plan), or direct dial phone number. Calls outgoing from PBX 127 to PSTN 128 or incoming from PSTN 128 to PBX 127 are typically circuit-switched calls. Within the enterprise, for example, between PBX 127 and terminal devices, voice calls are often packet-switched calls, for example Voice-over-IP (VoIP) calls.

PBX 127 possesses an intermediate conferencing server capability, and generally can host a conference call with a predetermined maximum number of participants, for example 3 to 7 participants. PBX 127 is configured to allow the moderator to possess one or more moderator controls. For example, typical moderator controls at the intermediate conference server level include joining a conference call, muting a participant, un-muting a participant, adding one or more participants, and dropping one or more participants. The particular moderator controls associated with the intermediate conference server can vary depending on the type of intermediate conference server used. Additionally, the controls available to the moderator can vary depending on whether the conference is an audio, video, or a combination thereof.

System 100 includes one or more conference bridges 132. Conference bridge 132 can be part of enterprise network 105. Additionally, in some embodiments, conference bridge 132 can be accessed via WAN 115 or PTSN 128.

Conference bridge 132 generally is configured to host conference calls with a maximum number of participants numbering in the 100s or more (for example, 1000). Conference bridge 132 is configured such that the moderator possesses a plurality of moderator controls. Conference bridge 132 moderator controls can include joining a conference call, muting one or more participants, speaking priority (i.e. when moderator speaks all participants are muted), listener mode, exiting the conference call, dropping one or more participants, recording the transcript of the conference call, creating side conferences, voting, raising hand, etc. Conferences hosted using conference bridge 132 typically have a larger maximum number of participants and a larger number of moderator controls. The particular moderator controls associated with the conference bridge can vary depending on the type of conference bridge used. Additionally, the controls available to the moderator can vary depending on whether the conference is an audio, video, or a combination thereof.

Enterprise network 105 can further include a Service Management Platform (SMP) 165 for performing some aspects of messaging or session control, like call control and advanced call processing features. Service Management Platform (SMP) can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers. SMP 165 is configured to connect different conference systems to create a heterogeneous conference, for example, a single teleconference, where participants can be joined to the conference via a mobile bridge and an intermediate conference server.

Moderator control system 400 can include one or more processors (not shown), a memory (not shown), and a data interface (not shown). The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers. Moderator control system 400 can be implemented on a mobile device, a single computer, distributed across a plurality of computers, or some combination thereof.

Figure 2:
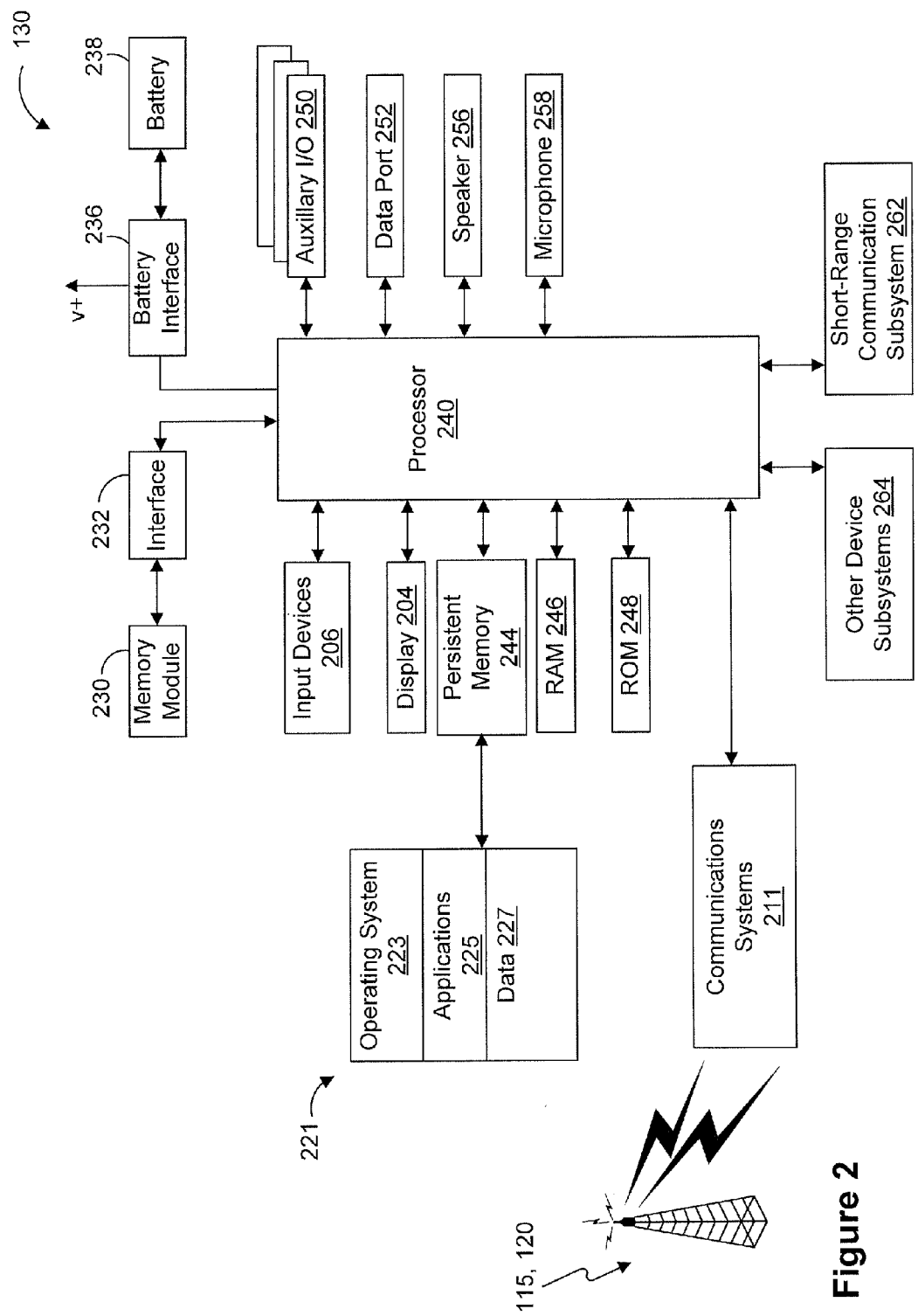
FIG. 2 shows a block diagram illustrating a mobile communication device in accordance with an example embodiment.

Reference is now made to FIG. 2 which illustrates in detail mobile device 130 in which example embodiments can be applied. Note that while FIG. 2 is described in reference to mobile device 130, it also applies to mobile devices 135, 136, and 140. Mobile device 130 is a two-way communication device having data and voice communication capabilities, and the capability to communicate with other computer systems, for example, via the Internet. Depending on the functionality provided by mobile device 130, in various embodiments mobile device 130 can be a handheld device, a multiple-mode communication device configured for both data and voice communication, a smartphone, a mobile telephone, a tablet, or a PDA (personal digital assistant) enabled for wireless communication.

Mobile device 130 includes a rigid case (not shown) housing the components of mobile device 130. The internal components of mobile device 130 can, for example, be constructed on a printed circuit board (PCB). The description of mobile device 130 herein mentions a number of specific components and subsystems. Although these components and subsystems can be realized as discrete elements, the functions of the components and subsystems can also be realized by integrating, combining, or packaging one or more elements in any suitable fashion.

Mobile device 130 includes a controller comprising at least one processor 240 (such as a microprocessor), which controls the overall operation of mobile device 130. Processor 240 interacts with device subsystems such as communication systems 211 for exchanging radio frequency signals with the wireless network (for example WAN 115 and/or PLMN 120) to perform communication functions. Processor 240 interacts with additional device subsystems including a display 204 such as a liquid crystal display (LCD) screen or any other appropriate display, input devices 206 such as a keyboard and control buttons, persistent memory 244, random access memory (RAM) 246, read only memory (ROM) 248, auxiliary input/output (I/O) subsystems 250, data port 252 such as a conventional serial data port or a Universal Serial Bus (USB) data port, speaker 256, microphone 258, short-range communication subsystem 262 (which can employ any appropriate wireless (for example, RF), optical, or other short range communications technology), and other device subsystems generally designated as 264. Some of the subsystems shown in FIG. 2 perform communication-related functions, whereas other subsystems can provide "resident" or on-device functions.

Display 204 can be realized as a touch-screen display in some embodiments. The touch-screen display can be constructed using a touch-sensitive input surface coupled to an electronic controller and which overlays the visible element of display 204. The touch-sensitive overlay and the electronic controller provide a touch-sensitive input device and processor 240 interacts with the touch-sensitive overlay via the electronic controller.

Communication systems 211 include one or more communication systems for communicating with wireless WAN 115 and wireless access points 125a and 125b within the wireless network. The particular design of communication systems 211 depends on the wireless network in which mobile device 130 is intended to operate. Mobile device 130 can send and receive communication signals over the wireless network after the required network registration or activation procedures have been completed.

Processor 240 operates under stored program control and executes software modules 221 stored in memory such as persistent memory 244 or ROM 248. Processor 240 can execute code means or instructions. ROM 248 can contain data, program instructions or both. Persistent memory 244 can contain data, program instructions, or both. In some embodiments, persistent memory 244 is rewritable under control of processor 240, and can be realized using any appropriate persistent memory technology, including EEPROM, EAROM, FLASH, and the like. As illustrated in FIG. 2, software modules 221 can include operating system software 223. Additionally, software modules 221 can include software applications 225.

In some embodiments, persistent memory 244 stores user-profile information, including, one or more conference dial-in telephone numbers. Persistent memory 244 can additionally store identifiers related to particular conferences. Persistent memory 244 can also store information relating to various people, for example, name of a user, a user's identifier (user name, email address, or any other identifier), place of employment, work phone number, home address, etc.

Software modules 221, for example, moderator control system 400, or parts thereof can be temporarily loaded into volatile memory such as RAM 246. RAM 246 is used for storing runtime data variables and other types of data or information. In some embodiments, different assignment of functions to the types of memory could also be used.

Software applications 225 can further include a range of applications, including, for example, an application related to a moderator control system, e-mail messaging application, address book, calendar application, notepad application, Internet browser application, voice communication (i.e., telephony) application, mapping application, or a media player application, or any combination thereof. Each of software applications 225 can include layout information defining the placement of particular fields and graphic elements (for example, text fields, input fields, icons, etc.) in the user interface (i.e., display 204) according to the application.

In some embodiments, auxiliary input/output (I/O) subsystems 250 comprise an external communication link or interface, for example, an Ethernet connection. In some embodiments, auxiliary I/O subsystems 250 can further comprise one or more input devices, including a pointing or navigational tool such as a trackpad, touchpad, joystick, clickable trackball or scroll wheel or thumbwheel, or one or more output devices, including a mechanical transducer such as a vibrator for providing vibratory notifications in response to various events on the mobile device 130 (for example, receipt of an electronic message or incoming phone call), or for other purposes such as haptic feedback (touch feedback).

In some embodiments, mobile device 130 also includes one or more removable memory modules 230 (typically comprising FLASH memory) and one or more memory module interfaces 232. Among possible functions of removable memory module 230 is to store information used to identify or authenticate a user or the user's account to the wireless network (for example WAN 115 and/or PLMN 120). For example, in conjunction with certain types of wireless networks, including GSM and successor networks, removable memory module 230 is referred to as a Subscriber Identity Module or SIM. Memory module 230 is inserted in or coupled to memory module interface 232 of mobile device 130 in order to operate in conjunction with the wireless network.

Mobile device 130 stores data 227 in persistent memory 244. In various embodiments, data 227 includes service data comprising information required by mobile device 130 to establish and maintain communication with the wireless network (for example WAN 115 and/or PLMN 120). Data 227 can also include, for example, scheduling and connection information for connecting to a scheduled call. Data 227 can include moderator control system data used by mobile device 130 for various tasks. For example, to add participants in a heterogeneous conference call, to provide moderator control over a heterogeneous conference call to mobile device 130 when mobile device 130 acts as a moderator device, to determine moderator identity when one or more conferences are merged with an existing conference to create a single heterogeneous conference, and to transfer moderator control from mobile device 130 to another heterogeneous conference participant, etc.

Mobile device 130 also includes a battery 238 which furnishes energy for operating mobile device 130. Battery 238 can be coupled to the electrical circuitry of mobile device 130 through a battery interface 236, which can manage such functions as charging battery 238 from an external power source (not shown) and the distribution of energy to various loads within or coupled to mobile device 130. Short-range communication subsystem 262 is an additional optional component which provides for communication between mobile device 130 and different systems or devices, which need not necessarily be similar devices. For example, short-range communication subsystem 262 can include an infrared device and associated circuits and components, or a wireless bus protocol compliant communication mechanism such as a BLUETOOTH communication module to provide for communication with similarly-enabled systems and devices.

A predetermined set of applications that control basic device operations, including data and possibly voice communication applications can be installed on mobile device 130 during or after manufacture. Additional applications and/or upgrades to operating system software 223 or software applications 225 can also be loaded onto mobile device 130 through the wireless network (for example WAN 115 and/or PLMN 120), auxiliary I/O subsystem 250, data port 252, short-range communication subsystem 262, or other suitable subsystem 264. The downloaded programs or code modules can be permanently installed, for example, written into the program memory (for example persistent memory 244), or written into and executed from RAM 246 for execution by processor 240 at runtime.

Mobile device 130 can provide three principal modes of communication: a data communication mode, a voice communication mode, and a video communication mode. In the data communication mode, a received data signal such as a text message, an e-mail message, Web page download, or an image file is processed by communication systems 211 and input to processor 240 for further processing. For example, a downloaded Web page can be further processed by a browser application, or an e-mail message can be processed by an e-mail message messaging application and output to display 204. A user of mobile device 130 can also compose data items, such as e-mail messages, for example, using the input devices in conjunction with display 204. These composed items can be transmitted through communication systems 211 over the wireless network (for example WAN 115 and/or PLMN 120). In the voice communication mode, mobile device 130 provides telephony functions and operates as a typical cellular phone. In the video communication mode, mobile device 130 provides video telephony functions and operates as a video teleconference term. In the video communication mode, mobile device 130 utilizes one or more cameras (not shown) to capture video of the video teleconference. Additionally, in some embodiments, mobile device 130 utilizes the one or more cameras to capture video. The video can be stored as one or more video data files in persistent memory 244, RAM 246, memory module 230, or any other data storage medium.

FIG. 3A illustrates an example conference (audio or video) between participant A on a mobile device and participant B where the mobile device is acting as a mobile bridge 305. The mobile device used by the moderator of the conference is referred to as the moderator device. In FIGS. 3A-3D the moderator devices are shown using "circles." In FIG. 3A, the moderator of the conference is participant A. If a conference participant decides to add participant C, the moderator device (for example, mobile device 130) automatically communicates with a server 300 (for example, SMP 165) to join participant C using an additional conference hosting system. In some embodiments, any mobile device can add additional participants. In other embodiments, only the moderator device can add additional participants. FIG. 3B illustrates a heterogeneous conference utilizing mobile bridge 305 to connect participant A and participant B and server 300 (for example, SMP 165), and a connection with participant C via an intermediate conference server 310 (for example PBX 127). Additional participants can then be added until the conference hosting systems have reached some maximum number of participants. This maximum value can be determined automatically by the moderator control system located on the mobile device of participant A. Or in some embodiments, the maximum value is automatically determined by server 300 or by one of the conferencing hosting systems included within the heterogeneous conferences, or some combination thereof. Additionally, in some embodiments the moderator can set the maximum participant value to a value one or more below the actual maximum of the heterogeneous conference. Once the maximum participant value occurs server 300 is configured to automatically conference in an additional conference resource, for example, a conference bridge 320 (can correspond to conference bridge 132), thus creating an expanded heterogeneous conference. In some embodiments, discussed below in reference to FIG. 4, the moderator control system 400 is configured to automatically conference in an additional conference resource without using server 300. FIG. 3C illustrates a heterogeneous conference utilizing mobile bridge 305, server 300, intermediate conference server 310, and conference bridge 320.

Additionally, server 300 is configured to communicate with the moderating device of the heterogeneous conference to ensure the moderating device retains moderator control over other participants in the heterogeneous conference. The amount of moderator control depends on how the participant is coupled to the heterogeneous conference. For example, in FIG. 3C moderator A has moderator control at the level of mobile bridge 305 in connection with participant B, because participant B is coupled to the conference via mobile bridge 305. In contrast, moderator A has moderator control at the level of intermediate conference server 310 in connection with participants C-K because participants C-K are coupled to the conference via intermediate conference server 310. Likewise, moderator A has moderator controls at the level of conference bridge 320 in connection with participants L-X because participants L-X are coupled to the conference via conference bridge 320.

Additionally, the location of the moderator within the heterogeneous conference makes no difference in terms of the moderator control available to the moderator over participants in the heterogeneous conference. For example, FIG. 3D illustrates that participant C is the moderator of the heterogeneous conference. The moderator control provided to moderator C, however, is in relation to the location of the participant being regulated. Thus, moderator C has moderator control over conference participants A-B, participants D-K, and participants L-X, at the level of mobile bridge 305, an intermediate conference server 310, and a conference bridge 320, respectively.

Referring back to FIG. 3C, server 300 is also configured to assist in transferring moderator control between devices joined in a heterogeneous conference. For example, when moderator A transfers moderator control to participant C. The moderating device communicates with server 300 and participant C's device (for example, mobile device 135) to pass moderation control to participant C. In some embodiments not shown, the moderator control system 400 is configured to automatically pass moderation control to participant C without using server 300.

Referring back to FIG. 1, collectively SMP 165, conference bridge 132, and PBX 127 is referred to as the enterprise communications platform, generally designated 180. It will be appreciated that enterprise communications platform 180 and, in particular, SMP 165, is implemented on one or more servers having suitable communications interfaces for connecting to and communicating with PBX 127, conference bridge 132 and DID/PRI trunks. Although SMP 165 can be implemented on a stand-alone server, it will be appreciated that it can be implemented into an existing control agent/server as a logical software component.

Mobile device 130 has a moderator control system 400 and is in communication with enterprise network 105. In some example embodiments, moderator control system 300 also operates on mobile devices 135, 136, and 140, computers 142 and 143, digital phone 160, or any variation thereof. In some embodiments, moderator control system 400 is in communication with and operates as part of a conference call program installed on mobile devices 130, 135, 136, and 140, and other servers on enterprise network 105, for example, SMP 165. Additionally, in some embodiments, moderator control system 400 is integral to the conference call program.

Figure 4:
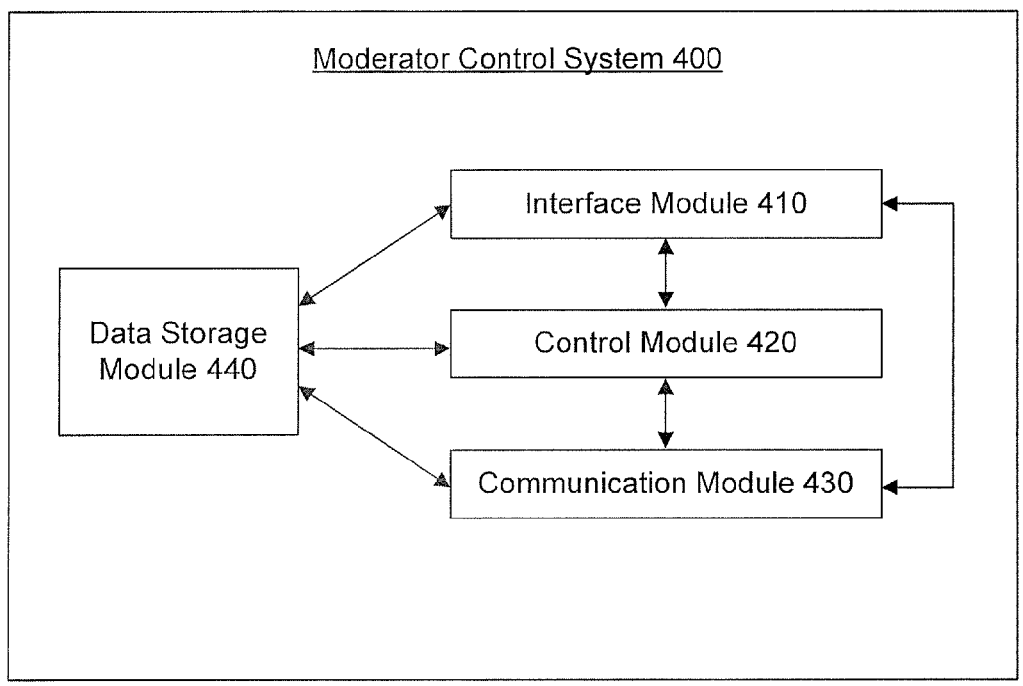
FIG. 4 is a block diagram depicting an example moderator control system for managing moderator controls in a heterogeneous conference.

FIG. 4 is a block diagram depicting example moderator control system 400. As illustrated, moderator control system 400 includes an interface module 410, a control module 420, a communication module 430, and a data storage module 440. It is appreciated that one or more of these modules can be deleted, modified, or combined together with other modules.

Figure 5:
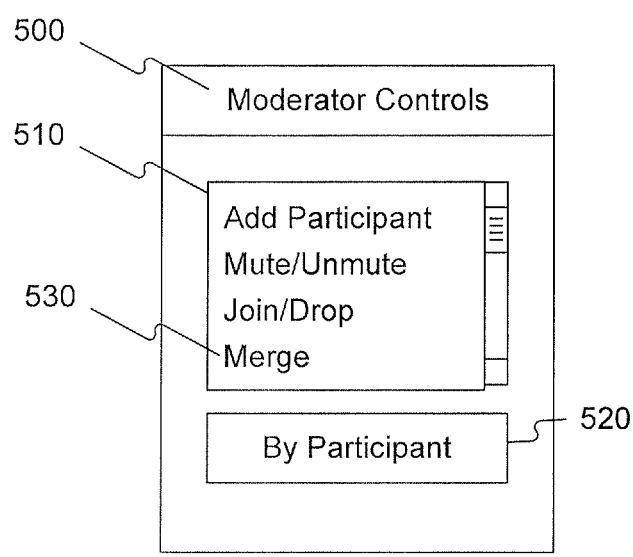
FIG. 5 illustrates an example moderator control graphical user interface.

Interface module 410 displays the moderator controls and enables selection of moderator controls. For example, interface module 410 enables the user to select different moderator controls. Interface module 410 can be coupled to control module 420, communication module 430, and data storage module 440. FIG. 5 illustrates an example moderator controls graphical user interface (GUI) 500 generated by interface module 410, displaying global controls 510. Global controls 510 can include one or more controls, for example add participant, mute/unmute a participant, join/drop a participant, and merge. The above listing of controls is not inclusive, and can include other moderator controls not listed. Additionally, the controls available to the moderator can vary depending on whether the conference is an audio, video, or a combination thereof. The add participant control allows the moderator to add an additional participant. The add participant control acquires a list of potential participants from a contact list associated with the moderator. The contact list can be stored in data storage module 440. Moderator controls GUI 500 displays the potential list of participants to the moderator. In a heterogeneous conference, after the moderator designates which participant is to be added, mobile device 130 communicates with a server (for example, SMP 165) to add the selected participant via one of the conference hosting systems included in the heterogeneous conference. The method of adding the additional participant is discussed below with reference to FIG. 7.

Global controls 510 can include a number of controls, for example, a mute control that mutes the moderator with respect to the rest of the conference, and a speaker priority control that mutes all the participants when the moderator speaks. The join control allows the moderator to join one or more other conferences as a participant of those conferences. Additionally, in some embodiments, there is an exit conference control (not shown) that allows the moderator to leave the heterogeneous conference. In some embodiments, when the exit control is executed, the moderator control system can prompt the moderator to transfer moderator control to another conference participant before leaving the heterogeneous conference.

Global controls 510 also can include merge control 530. Merge control 530 allows the moderator to merge one or more conferences with the existing conference. In some embodiments, the moderator is acting as the moderator of at least one of the conferences being merged. The above listing of controls is not inclusive, and can include other moderator controls not listed. Merging one or more conferences is discussed in detail below in reference to FIGS. 8-10.

Additionally, FIG. 5 illustrates a By Participant button 520. Selecting By Participant button 520 displays a listing of participants of the heterogeneous conference and the associated moderator control over the participants in the listing. For example, the moderator will have the most control in relation to participants coupled to the heterogeneous conference via a conference bridge and the least controls in relation to participants coupled to the heterogeneous conference via a mobile bridge (for example mobile bridge 305).

Figure 6A:
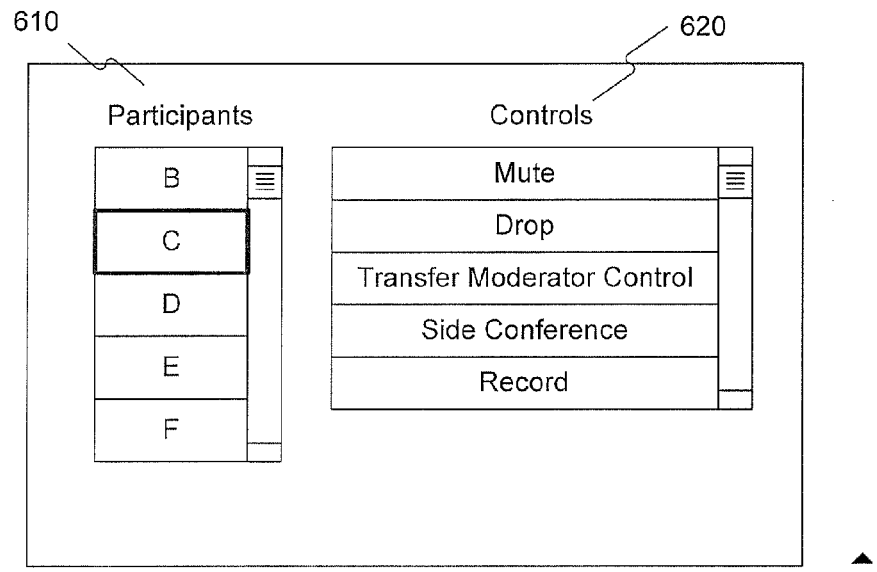
FIG. 6A illustrates an example moderator control menu broken down by participant and participant C selected.

FIG. 6A illustrates an example menu display opened when By Participant button 520 is selected. Participants 610 lists all the participants in the heterogeneous conference call. Controls 620 lists the available controls that the moderator has for each participant. When the moderator highlights a particular participant, for example, participant C, the available controls are displayed as active in controls 620. Participant C can be coupled to the heterogeneous conference via a conference bridge (for example conference bridge 132), accordingly all the controls associated with the conference bridge are listed in the control listing 620 as corresponding to participant C. Likewise, if participant C were coupled to the conference via an intermediate conference server, then all the controls associated with the intermediate conference server would be listed in the control listing 620 as corresponding to participant C.

Figure 6B:
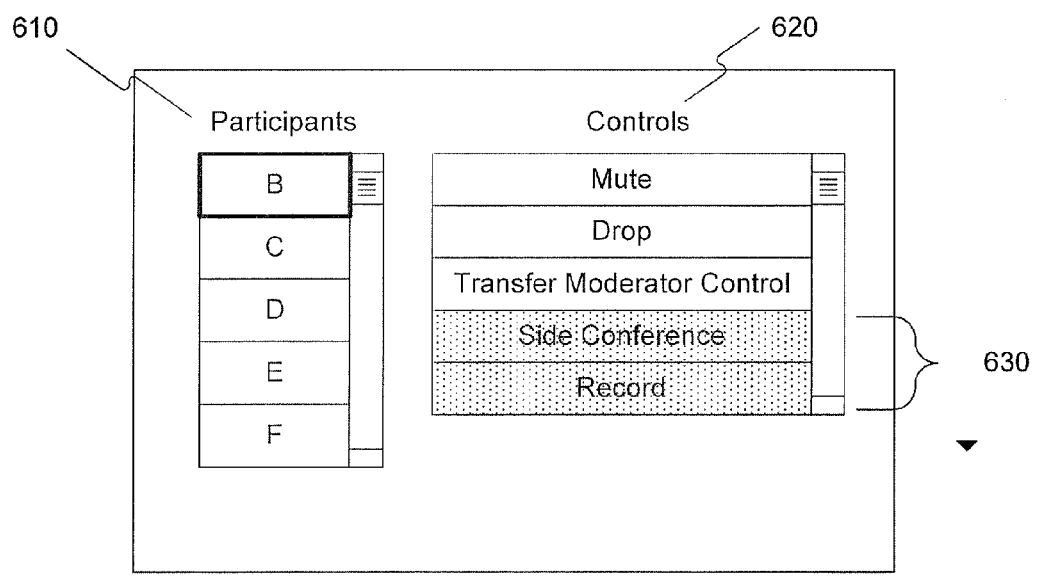
FIG. 6B illustrates an example moderator control menu broken down by participant and participant B selected.

In some embodiments, controls 620 includes all the moderator controls available regardless of whether the controls are used for a particular participant. In this embodiment, when a participant is selected from participants 610, moderator controls that are not available are displayed as being inactive controls 630. For example, FIG. 6B illustrates a menu where participant B is highlighted. Participant B is coupled to the heterogeneous conference using a mobile bridge, accordingly the moderator control over participant B is less than moderator control over participant C, which is coupled to the heterogeneous conference via the conference bridge. In this example, moderator controls associated with a mobile bridge are limited to mute, drop, and transfer moderator control. In this example, inactive controls 630 in relation to participant B include, side conference and record. In some embodiments, as additional conference hosting systems with new controls are added to the heterogeneous conference, the new controls are added to controls 620. Likewise, if a particular conference hosting system is removed from the heterogeneous conference that has moderator controls specific to the particular conference hosting system, those controls are removed from controls 620. Control module 420 is configured to track what level of moderator control is available over each heterogeneous conference participant. When a control is asserted in relation to a participant coupled via a particular conference hosting system, control module 420 communicates with a server (for example, server 300) via communication module 430 to execute the selected control. For example, if the moderator exercises the mute control over the participant, control module 420 would transmit this control to the server, which would then re-transmit the mute control to the particular conference hosting system which then mutes the participant. Because the conference is heterogeneous, the format of the controls can be different depending on how the participant is coupled to the heterogeneous conference. For example, referring to FIG. 3C, a mute control to be exercised over participant C is formatted such that it is recognized by intermediate conference server 310. Whereas, the same mute control, sent to participant L coupled to the heterogeneous conference via conference bridge 320, can require a different format for conference bridge 320 to recognize the control. Server 300 receives controls from control module 420 and automatically formats them to conform with the protocols of the conference hosting systems coupled to the heterogeneous conference. Referring back to FIG. 4, in some embodiments, moderator control system 400 places the controls in the appropriate format before sending them to the server, which then relays the controls to the appropriate conference hosting system. Additionally, in some embodiments moderator control system 400 directly sends the properly formatted controls to the conference hosting systems which make up the heterogeneous conference. Additionally, in some embodiments, moderator control system 400 is configured to send conference information to one or more conference participants. Conference information can include number of conference participants, identity of conference participants, and roles of conference participants (acting as a moderator or a subgroup moderator). Control module 420 can be coupled to interface module 410, communication module 430, and data storage module 440.

Communication module 430 is configured to transmit moderator controls, via enterprise network 105, PLMN 120, WAN 115, or some combination thereof, to server 300 (for example, SMP 165). Additionally, in some embodiments communication module 430 directly sends properly formatted controls to the conference hosting systems which make up the heterogeneous conference. In some embodiments, communication module 430 sends conference information to one or more conference participants. In some embodiments, communication module 430 can store a record of the communications sent and received in data storage module 440. Communication module 430 can be coupled to interface module 410, control module 420, and data storage module 440.

Data storage module 440 can also include a database, one or more computer files in a directory structure, or any other appropriate data storage mechanism such as a memory. Additionally, in some embodiments, data storage module 440 stores user profile information, including, one or more conference dial in telephone numbers, identifiers associated with particular conferences, information relating to various people, for example, name, place of employment, work phone number, home address, etc., and conference information. Conference information can include number of conference participants, identity of conference participants, and roles of conference participants (acting as a moderator or a subgroup moderator). In some example embodiments, data storage module 440 is distributed across one or more network servers. Data storage module 440 can communicate with interface module 410, control module 420, and communication module 430.

Each of modules 410, 420, 430, and 440 can be software programs stored in a RAM, a ROM, a PROM, a FPROM, or other dynamic storage devices, or persistent memory for storing information and instructions.

Figure 7:
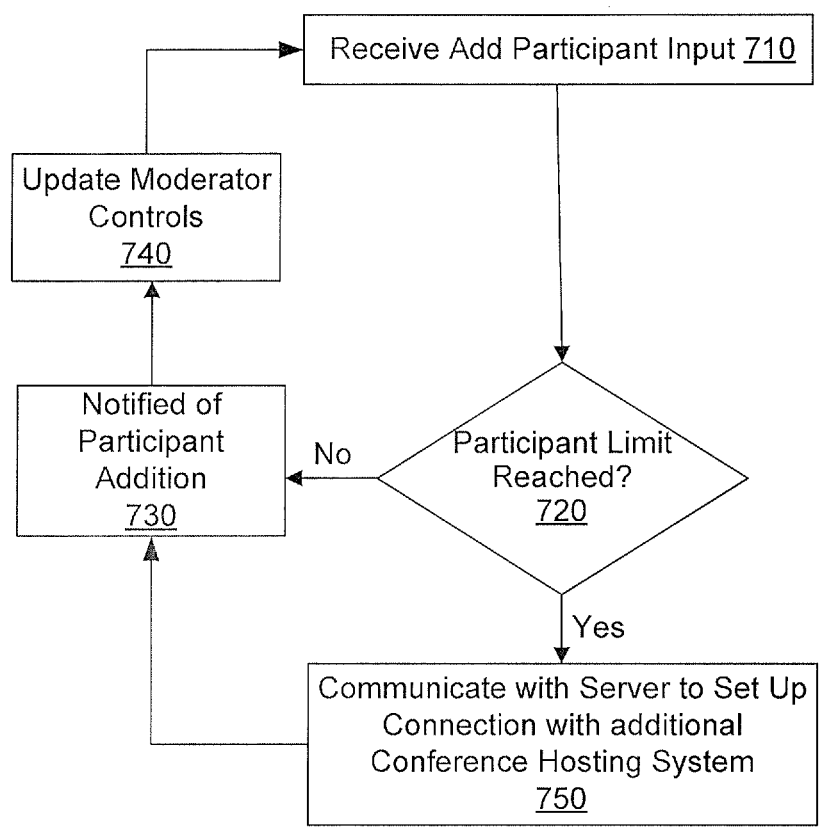
FIG. 7 shows a flowchart representing an example method for adding additional conference hosting systems to create an expanded heterogeneous conference.

FIG. 7 is a flowchart representing an example method for adding participants to create a heterogeneous conference. While the flowchart discloses the following steps in a particular order, it is appreciated that at least some of the steps can be moved, modified, or deleted where appropriate.

In step 710, a moderator control system receives a control to add an additional participant. In step 720, the moderator control system automatically determines whether the participant limit of the heterogeneous conference has been reached. If the hosting systems that make up the heterogeneous conference have not reached the participant limit, the new participant is added (step 730). The moderator device then updates the moderator controls to include the newly added participant (step 740). If, however, the participant limit would be reached, then the server adds the participant using an additional conference hosting system and notifies the moderator device that the participant has been added (step 750). For example, the new participant can be added using an additional mobile bridge, intermediate conference server, conference bridge, or media server. In some embodiments, not shown, the moderator control system is configured to add the participant using the additional conference hosting system.

The moderator device then updates the moderator controls to include the newly added participant (step 740). This process continues indefinitely until all participants are added to the heterogeneous conference. Additionally, in some embodiments the combination of hosting systems that make up the heterogeneous conference does not matter. For example, the heterogeneous conference can use a plurality of mobile bridges, intermediate conference servers, and conference bridges.

Figure 8A:
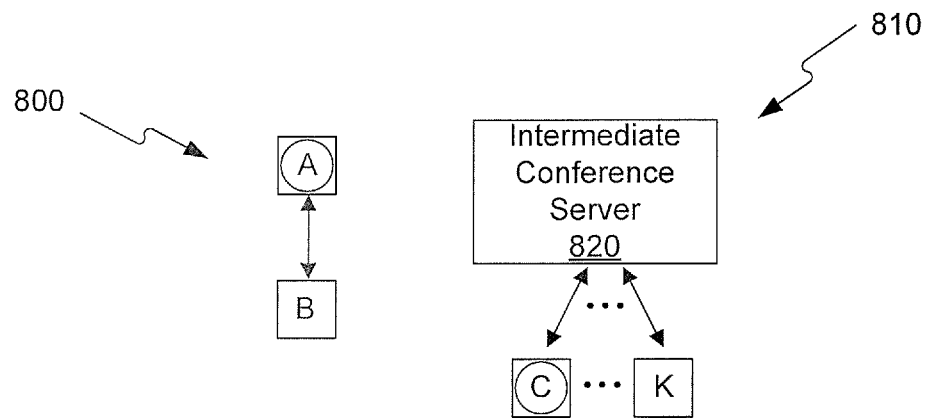
FIG. 8A shows an example conference call using a mobile bridge and a separate conference call using an intermediate conference server.

FIG. 8A shows an example homogeneous (single conference hosting platform) conference call 800 using a mobile bridge, and a separate homogeneous conference call 810 using an intermediate conference server 820. The moderator of conference call 800 is moderator A, and conference call 800 has a single participant B. Because conference call 800 is using the mobile bridge, only moderator controls associated with the mobile bridge are available to moderator A. Generally, moderator control in conferences held via a mobile bridge is minimal, as are the number of allowed participants. For example, mute, drop, and transfer, are controls that could be available to moderator A to exercise over participant B in conference call 800.

The moderator of conference call 810 is moderator C, and conference call 810 has a plurality of participants in addition to moderator C. Because conference call 810 is using the intermediate conference server 820, only moderator controls associated with the intermediate conference server 820 are available to moderator C. Generally, moderator control in conferences held via intermediate conference servers are more than numerous, as are the number of allowed participants, than moderator control associated with conferences held via mobile bridges. For example, mute, drop, transfer, and join, are controls that could be available to moderator C to exercise over participants in conference call 810.

Figure 9:
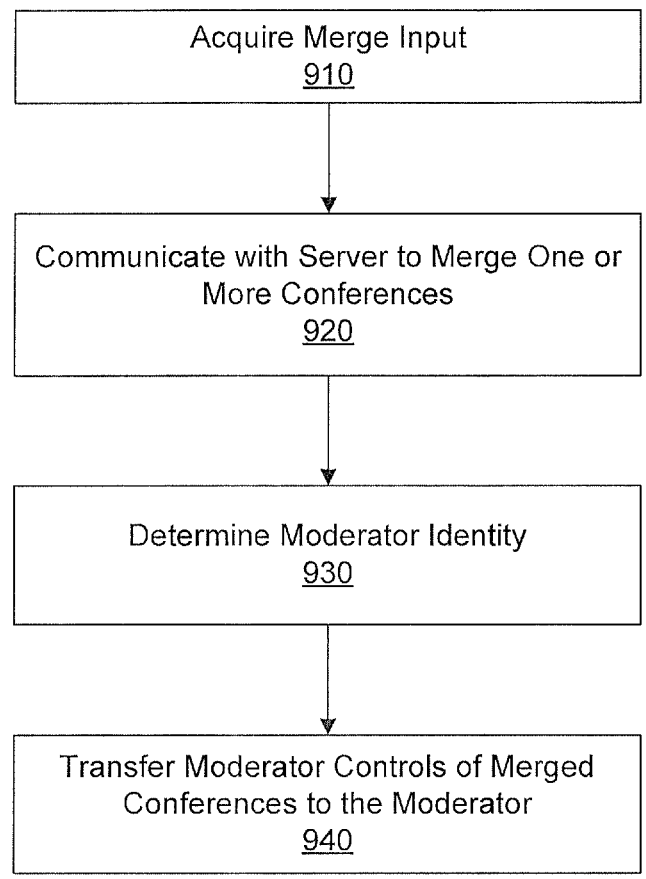
FIG. 9 shows a flowchart representing an example method for merging one or more conferences into a single heterogeneous conference.

FIG. 9 is a flowchart representing an example method for establishing moderator control when merging one or more conferences to create a single heterogeneous conference using a moderator controls system. While the flowchart discloses the following steps in a particular order, it is appreciated that at least some of the steps can be moved, modified, or deleted where appropriate.

Figure 10:
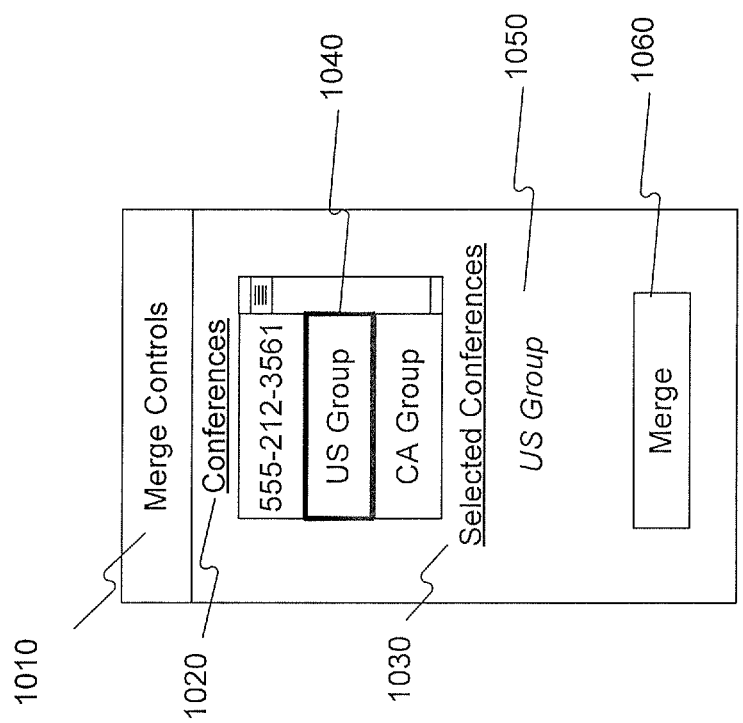
FIG. 10 illustrates an example merge control menu.

In step 910, a moderating device acquires a merge input, in the form of a merge control. For example, referring to FIG. 5, an example merge control 530 is listed on the moderator controls GUI 500. Merge control 530 is used to merge one or more conferences with the conference being moderated by the moderating device. The one or more conferences can be hosted using the same type or different types of hosting systems. For example, the moderator can merge a conference hosted on a conference bridge and a separate conference hosted on an intermediate conference server to an existing conference that the moderator is controlling. In some embodiments, the moderator can be a participant in the one or more conferences that are being merged, but not have moderator control. FIG. 10 illustrates an example merge control menu 1010. If merge control 530 is selected, the merge controls menu 1010 opens from which the moderator can select which conferences to be merged with the existing conference. Merge control menu 1010 includes a listing of conferences 1020 that the moderator can select for merging. Conferences listing 1020 displays potential conferences to merge via a dial-in number or an associated identifier, for example, US Group 1040. If the moderator selects a particular conference from conferences listing 1020, it is displayed under selected conferences 1030. For example, in FIG. 10, US Group conference 1040 is selected and is displayed in the selected field 1050. The moderator can then select the merge button 1060 to execute the merge of the conference US Group with the existing conference the moderator is currently moderating.

Referring back to FIG. 9, in step 920, the moderator device communicates with a server to merge the one or more conferences, for example US Group 1040 with the existing conference. The server establishes the appropriate connections with conference hosting systems of the one or more conferences being merged. In some embodiments not shown, the moderator device can directly establish the appropriate connections with the conference hosting systems.

Each of the one or more conferences prior to merging have their own moderator (pre-merge moderator). After merging the calls into a single heterogeneous conference, however, only one moderator exists. In step 930, the moderator control system determines the moderator identity. In some embodiments, the moderator control system is configured to automatically make the pre-merge moderator who is merging the conference calls the moderator. In other embodiments, the moderator control system prompts each of the pre-merge moderators to determine who shall retain moderator control. Additionally, in some embodiments the moderator control system automatically passes moderator control to the pre-merge moderator with the largest number of participants. In some embodiments not shown, one or more of the pre-merge moderators who are not identified as the moderator of the merged heterogeneous conference can become a sub-group moderator. The sub-group moderator retains limited moderator control over the participants it controlled in the pre-merge conference. For example, in FIG. 8A the pre-merge moderators are participants A and C. If these separate conferences were to merge (FIG. 8B), the moderator control system would determine a moderator for the merged conference (moderator A) and, in this embodiment, would also identify participant C as a sub-group moderator. Sub-group moderator C retains limited moderator control over participants D to K who are coupled to the conference via intermediate conference server 820. The controls of the sub-group moderator can be greater than, the same as, or less than the controls available to the sub-group moderator pre-merge.

Figure 8B:
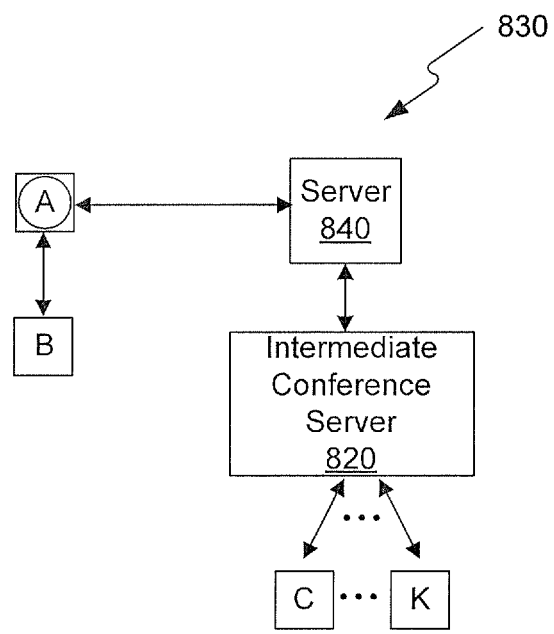
FIG. 8b shows an example conference call merged conference call.

In step 940, moderator control over all the participants in the merged heterogeneous conference is transferred to the moderator. The level of moderator control a moderator has over a particular participant is dependent on how the participant is coupled to the heterogeneous conference. In particular, it depends on the controls associated with the conference hosting system that the participant is using to connect to the heterogeneous conference. For example, referring to FIG. 8A, moderator A can merge conference call 800 with conference call 810 resulting in a single heterogeneous conference call 830 as shown in FIG. 8B. Participant B is coupled to the heterogeneous conference 830 via the mobile bridge. Thus, moderator A possesses only those moderator controls associated with the mobile bridge with respect to participant B. Accordingly, in this example, moderator A is only able to exercise the mute, drop, and transfer controls over participant B.

In contrast, participants C-K are coupled to the heterogeneous conference call 830 via intermediate conference server 820. Thus, moderator A possesses only those moderator controls associated with intermediate conference server 820 with respect to participants C-K. Accordingly, in this example moderator A is only able to exercise the mute, drop, transfer, side conference, and record controls over participants C-K, for example, as shown in FIG. 6A. Moderator A would not be able to exercise the side conference or record controls over participant B, for example as shown in FIG. 6B.

Similarly, if a participant is coupled to the heterogeneous conference via server conference bridge (not shown), the level of moderator control associated with the participant are the moderator controls of the conference bridge. In some embodiments not shown, the moderator control system also transfers sub-group moderator control to the one or more identified sub-group moderators.

Additionally, in some embodiments not shown, the moderator control system also transfers conference information to the identified moderator. Conference information can include number of conference participants, identity of conference participants, and roles of conference participants (acting as a moderator or a subgroup moderator).

Certain adaptations and modifications of the described embodiments can be made. Therefore, the above discussed embodiments are considered to be illustrative and not restrictive.

Embodiments of the present application are not limited to any particular operating system, mobile device architecture, server architecture, or computer programming language.

What is claimed is:

1. A method implemented by one or more processors, the method comprising:

acquiring a merge control, by one or more processors, to merge a first conference with a second conference to create a single heterogeneous conference, wherein the first conference and the second conference utilize different types of conference hosting systems and the first conference has an associated first pre-merge moderator and the second conference has an associated second pre-merge moderator;

merging, by one or more processors, the first conference with the second conference to create the heterogeneous conference;

determining a moderator for the heterogeneous conference; and automatically transferring, by one or more processors, moderator controls over each of the participants in the heterogeneous conference from the first pre-merge moderator and/or second pre-merge moderator to the moderator of the heterogeneous conference.

2. The method of claim 1, wherein the types of hosting systems are selected from the group consisting of a mobile bridge, an intermediate conference server, and a conference bridge.

3. The method of claim 1, wherein automatically transferring one or more moderator controls to a moderator device associated with the moderator of the heterogeneous conference includes transferring conference information.

4. The method of claim 1, further comprising sending the merge control to a server, wherein the server is configured to establish conference connections with the first conference and the second conference.

5. The method of claim 1, wherein determining the moderator for the heterogeneous conference includes sending a prompt to the first and second pre-merge moderators asking who will assume moderator control over the heterogeneous conference.

6. The method of claim 1, wherein determining the moderator for the heterogeneous conference includes automatically selecting the first pre-merge moderator or the second pre-merge operator based on who initiated the merge of first and second conferences as the moderator of the heterogeneous conference.

7. The method of claim 1, wherein determining the moderator for the heterogeneous conference includes automatically selecting the first pre-merge moderator or the second pre-merge moderator based on which of the first conference or the second conference has a larger number of participants.

8. The method of claim 1, wherein determining the moderator for the heterogeneous conference is the first pre-merge moderator, further comprising:

selecting the second pre-merge moderator as a sub-group moderator.

9. The method of claim 1, further comprising:

selecting one of the participants of the heterogeneous conference to transfer moderator control;

sending a request, by a moderator device, to transfer moderator control; and transferring moderator control, by the moderator device, to the selected participant.

10. The method of claim 1, further comprising:

exercising moderator control over a participant of the heterogeneous conference, wherein exercising moderator control includes:

selecting the participant from a list of participants;

selecting a control from a list of moderator controls associated with the participant; and sending the control to the server.

11. The method of claim 10, further comprising:
   identifying which of the first conference and the second conference the participant is using to connect to the heterogeneous conference; and
   formatting the control such that it is recognized by the identified conference hosting system.

12. A non-transitory computer-readable medium comprising program code, the program code being operable, when executed by a computer system, to cause the mobile device to perform a method, the method comprising:
   acquiring a merge control to merge a first conference with a second conference to create a single heterogeneous conference, wherein the first conference and the second conference utilize different types of conference hosting systems and the first conference has an associated first pre-merge moderator and the second conference has an associated second pre-merge moderator;
   merging the first conference with the second conference to create the heterogeneous conference;
   determining a moderator for the heterogeneous conference; and
   automatically transferring moderator controls over each of the participants in the heterogeneous conference from the first pre-merge moderator and/or second pre-merge moderator to the moderator of the heterogeneous conference.

13. The non-transitory computer readable medium of claim 12, wherein the types of hosting systems are selected from the group consisting of a mobile bridge, an intermediate conference server, and a conference bridge.

14. The non-transitory computer readable medium of claim 12, wherein automatically transferring one or more moderator controls to a moderator device associated with the moderator of the heterogeneous conference includes transferring conference information.

15. The non-transitory computer readable medium of claim 12, wherein determining the moderator for the heterogeneous conference includes sending a prompt to the first and second pre-merge moderators asking who will assume moderator control over the heterogeneous conference.

16. The non-transitory computer readable medium of claim 12, wherein determining the moderator for the heterogeneous conference includes automatically selecting the first pre-merge moderator or the second pre-merge operator based on who initiated the merge of first and second conferences as the moderator of the heterogeneous conference.

17. The non-transitory computer readable medium of claim 12, wherein determining the moderator for the heterogeneous conference includes automatically selecting the first pre-merge moderator or the second pre-merge moderator based on which of the first conference or the second conference has a larger number of participants.

18. The non-transitory computer readable medium of claim 12, wherein determining the moderator for the heterogeneous conference is the first pre-merge moderator, further comprising:
   selecting the second pre-merge moderator as a sub-group moderator.

19. The non-transitory computer readable medium of claim 12, further comprising:
   selecting one of the participants of the heterogeneous conference to transfer moderator control;
   sending a request, by a moderator device, to transfer moderator control; and
   transferring moderator control, by the moderator device, to the selected participant.

20. The non-transitory computer readable medium of claim 12, further comprising:
   exercising moderator control over a participant of the heterogeneous conference, wherein exercising moderator control includes:
      selecting the participant from a list of participants;
      selecting a control from a list of moderator controls associated with the participant; and
      sending the control to the server.

21. The non-transitory computer readable medium of claim 20, further comprising:
   identifying which conference hosting system the participant is using to connect to the heterogeneous conference; and
   formatting the control such that it is recognized by the identified conference hosting system.

22. The non-transitory computer readable medium of claim 12, further comprising sending the merge control to a server, wherein the server is configured to establish conference connections with the first conference and the second conference.

23. A server comprising:
   a memory storing computer instructions;
   one or more processors configured to execute the computer instructions such that the server is configured to:
      acquire a merge control to merge a first conference with a second conference to create a single heterogeneous conference, wherein the first conference and the second conference utilize different types of conference hosting systems;
      merge the first conference with the second conference to create the heterogeneous conference;
      determine a moderator for the heterogeneous conference; and
      automatically transfer moderator controls over each of the participants in the heterogeneous conference to a moderator device of the heterogeneous conference.

24. The server of claim 23, wherein the types of hosting systems are selected from the group consisting of a mobile bridge, an intermediate conference server, and a conference bridge.

25. The server of claim 23, wherein the one or more processors configured to execute the computer instructions such that the server is further configured to:
   receive a control from the moderator to be exercised over a participant of the heterogeneous conference;
   identify which conference hosting system the participant is using to connect to the heterogeneous conference;
   format the control such that it is recognized by the identified conference hosting system; and
   send the formatted control to the identified system.

26. The server of claim 23, wherein the one or more processors configured to execute the computer instructions such that the server is further configured to:
   receive a request to add a participant to the heterogeneous conference;
   determine if a participant limit has been reached for the heterogeneous conference;
   connect with an additional conference hosting system, if the participant limit is reached, to create an expanded heterogeneous conference;
   add the participant to the expanded heterogeneous conference via the additional conference hosting system;
   notify the moderator device that the participant has been added; and
   send to the moderator device updated moderator controls that correspond to the added participant.

27. The server of claim 26, wherein the additional hosting system is selected from the group consisting of a mobile bridge, an intermediate conference server, and a conference bridge.

28. The server of claim 23, wherein the one or more processors configured to execute the computer instructions such that the server is further configured to establish conference connections with the first conference and the second conference.

29. A mobile device comprising:
a memory storing computer instructions;
one or more processors configured to execute the computer instructions such that the mobile device is configured to:
acquire a merge control to merge a first conference with a second conference to create a single heterogeneous conference, wherein the first conference and the second conference utilize different types of conference hosting systems;
merge the first conference with the second conference to create the heterogeneous conference;
determine the identity of the moderator of the heterogeneous conference; and
automatically transfer moderator controls over each of the participants in the heterogeneous conference to the moderator of the heterogeneous conference.

30. The mobile device of claim 29, wherein the one or more processors configured to execute the computer instructions such that the mobile device is further configured to:
receive a request to add a participant to the heterogeneous conference;
determine if a participant limit has been reached for the heterogeneous conference;
send a request to the server to connect an additional conference hosting system, if the participant limit is reached, to create an expanded heterogeneous conference;
acquire notification that the participant is added to the heterogeneous conference; and
update moderator controls corresponding to the added participant.

31. The mobile device of claim 29, wherein the one or more processors configured to execute the computer instructions such that the mobile device is further configured to send the merge control to a server, wherein the server is configured to establish conference connections with the first conference and the second conference.

* * * * *